United States Patent [19]

Peyton

[11] 4,032,185
[45] June 28, 1977

[54] INTERNAL GRIPPER APPARATUS

[76] Inventor: John J. Peyton, 1644 Payeras, Santa Barbara, Calif. 93109

[22] Filed: June 11, 1976

[21] Appl. No.: 695,004

[52] U.S. Cl. .............................. 294/97; 294/86.25; 214/1 BA; 198/696
[51] Int. Cl.² .......................................... B66C 1/42
[58] Field of Search ............. 294/97, 110 R, 86.24, 294/86.25; 198/696, 694; 214/1 BA

[56] References Cited

UNITED STATES PATENTS

| | | | |
|---|---|---|---|
| 2,885,010 | 5/1959 | Frost | 294/97 |
| 3,064,855 | 11/1962 | Fischer | 294/97 |

*Primary Examiner*—James B. Marbert
*Attorney, Agent, or Firm*—Blakely, Sokoloff, Taylor & Zafman

[57] ABSTRACT

Internal gripper apparatus for use in uncasers and the like, for controllably gripping bottles or other containers from within for transport and release as desired. The internal grippers are spring-loaded to an outer position though automatically retract as required for insertion into the mouth of a container, gripping the container near the top, or at the ridge adjacent the top of the container characteristic of nearly all containers. The grippers have an upward extending centrally disposed actuating member which may be slidably encouraged to a lower position to retract the grippers and release a container held thereby. The grippers provide relatively close axial positioning of the containers to provide the desired separation of containers on container handling apparatus, and further include supporting structure to allow retraction of the gripper on engagement with broken or inverted containers or other obstructions in the normal operation of the gripper apparatus.

18 Claims, 7 Drawing Figures

INTERNAL GRIPPER APPARATUS

BACKGROUND OF THE INVENTION

1. Field of the Invention

The present invention relates to the field of container handling apparatus, and more particularly to the field of apparatus for individually handling containers as may be used in container uncasing apparatus.

2. Prior Art

Various types of container handling apparatus are well known in the prior art. Such apparatus includes equipment for handling containers individually and for handling containers in bulk. (Most common of this latter type are conveyor systems which generally transport a continuous stream of containers which are generally unsynchronized with respect to the conveyor system, except as may be accomplished at the entry to a particular piece of equipment fed by the conveyor, or as may naturally result from the delivery of containers to the conveyor by equipment individually handling the containers).

Equipment for individually handling containers generally has certain physical constraints within which it must operate. In particular, containers are commonly encountered by such equipment supported from the bottom thereof, whether on a conveyor or in cases from which they are to be removed. If located on a conveyor, reasonable access to both the sides and the top of the containers is generally avaiable, so that grippers for individually receiving containers from a conveyor system may engage the containers from the side or top (or both) depending upon the purposes for which they are to be individually handled and the preference of the equipment designer. In certain situations, however, side access to containers is not available, and access from above has certain inherent physical constraints limiting the nature of the grippers which might be considered for use.

The most notable of the foregoing limitations is encountered in uncasers, that is, equipment for removing empty containers from cases or cartons in which they are received and delivering the containers to a container filling system. It is common practice for containers for certain products to be shipped to the product manufacturer by the container manufacturer in cardboard boxes having the top flaps folded but not sealed. These boxes are marked with the appropriate marking of the product manufacturer (not the container manufacturer) so that the product manufacturer may remove the containers, fill the containers with its product and replace the containers in the boxes for sealing and shipment. In this manner boxes are essentially reused so as to provide maximum convenience in handling both the empty containers and the filled containers. However, equipment is needed for removing containers from cartons and cases where side access in unavailable. In such instances each individual container must be engaged from above to be positively lifted from the carbon or case and then controllably released, typically on a conveyor system for transport to the next stage of the filling process.

The tops of the containers handled by such apparatus vary considerably, ranging from narrow mouth containers characteristic of soft drink bottles and the like, to wide mouth containers as are now used for products such as peanut butter. Apparatus for handling narrow mouth containers is well known in the prior art, with one example of such equipment being disclosed in U.S. Pat. No. 3,938,847. In the case of wide mouth containers, however, there is insufficient room between containers in a carton or case for a gripper to contract around the outside of the containers, thereby requiring some form of internal gripper in the handling apparatus.

In the prior art, grippers for retaining containers from within have generally been some form of pneumatic apparatus, depending upon the actuation of a pneumatically expandable and contractable bladder in each gripper to provide the gripping and release functions. Such grippers generally operate satisfactorily, though result in certain complexities because of the requirement of a vacuum or pressure source as a prime mover, the connection of each individual gripper on a transport mechanism to the pressure or vacuum source, and the control of the pressure or vacuum source for individual grippers to provide the gripping and release at the appropriate points of progress of the transport system.

One form of mechanical case unloader is disclosed in U.S. Pat. No. 2,609,109. In this unloader a row of internal grippers is mechanically operated in unison by a single operating mechanism, providing substantially positive vertical motion and gripping action as a result of the unitary actuating mechanism. Other grippers, generally relating to nonanalagous arts, are disclosed in U.S. Pat. Nos. 1,504,566; 2,610,082; 2,885,010; 2,491,682; 2,155,620; 3,064,855; and 2,789,859.

BRIEF SUMMARY OF THE INVENTION

Internal gripper apparatus for use in uncasers and the like, for controllably gripping bottles or other containers from within for transport and release as desired. The internal grippers are spring-loaded to an outer position though automatically retract as required for insertion into the mouth of a container, gripping the container near the top, or at the ridge adjacent the top of the container characteristic of nearly all containers. The grippers have an upward extending centrally disposed actuating member which may be slidably encouraged to a lower position to retract the grippers and release a container held thereby. The grippers provide relatively close axial positioning of the containers to provide the desired separation of containers on container handling apparatus, and further include supporting structure to allow retraction of the gripper on engagement with broken or inverted containers or other obstructions in the normal operation of the gripper apparatus.

Fabrication of certain major gripper components from plastic materials having high impact resistance and self-lubricating characteristics such as Delrin provides long, substantially maintenance-free life for the grippers. Also, by appropriately proportioning the grippers and perhaps allowing some settling of the containers onto a receiving conveyor, a simple, short duration release actuation of the gripper will provide positive releasing of containers handled thereby.

DETAILED DESCRIPTION OF THE INVENTION

The present invention comprises internal gripping apparatus for the handling of containers, typically large mouth containers, as may be encountered in the various processing and packaging industries. The specific embodiment disclosed in detail herein is designed and configured for use in a "case unloader" to adapt such equipment for the removal of large mouth bottles and other containers from cartons or cases by gripping the containers from within the opening thereof. More particularly, the specific embodiment disclosed herein is designed to be mountable on the apparatus of the full depth uncaser disclosed in U.S. Pat. No. 3,938,847; accordingly, only certain aspects of that apparatus will be described herein, the remainder of such apparatus being described in detail in the foregoing patent.

Figure 1:
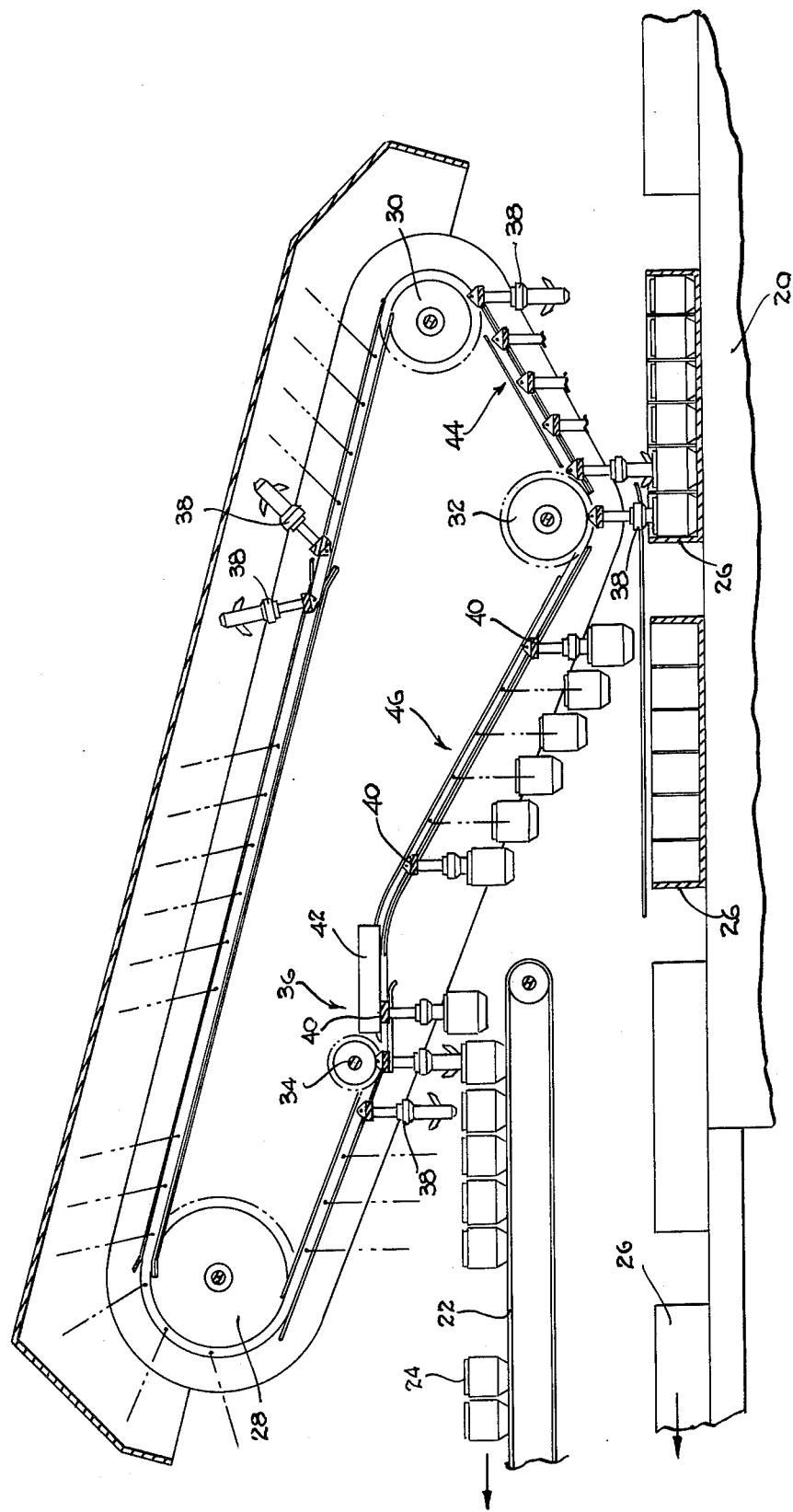
FIG. 1 is a side view of a case unloader generally in accordance with U.S. Pat. No. 3,938,847, illustrating the mounting and operation of the present invention gripper in conjunction with such apparatus.

Referring now to FIG. 1, a cross section through the case unloader of U.S. Pat. No. 3,938,847 incorporating the present invention may be seen. This cross section in essence shows the various general functional elements of the case unloader in a rather schematic form, thereby illustrating the purpose and manner of use of the specific embodiment of gripper hereinafter disclosed in detail. The case unloader is designed to operate in conjunction with a case feeder system, generally indicated by the numeral 20, for providing cases to be unloaded to the uncaser, and a receiving conveyor 22 for receiving the containers 24 removed from the cases 26 on the feeder system 20. The uncaser utilizes a continuous chain at each side thereof supported on the one side shown by sprockets 28, 30, 32 and 34, and further guided by slides between the sprockets which, among other things, establish a short, relatively straight horizontal chain path in the region 36 above the receiving conveyor 22. The individual grippers 38 are supported in rows on horizontal bars 40 extending between like positions on the two adjacent chains and guided at various times by guides at each end of the bars 40 by cam-like slide devices to determine the angular orientation (position of the center line) of the grippers as suggested in the figure. In region 36 the angular orientation of the bars 40 is further determined by a slide member 42 positioned to intersect and stabilize the bars at the position immediately above the entry to the receiving conveyor 22. As disclosed in the foregoing patent, the downward slope of the gripper trajectory in region 44 is the same as the upward slope in region 46, so that by spacing the grippers slightly further apart on the chain than the containers in the cases to be unloaded, and by having the liner speed of the chain slightly higher than the linear speed of the cases in accordance with the incline of chain sections 44 and 46, the grippers will generally be accurately aligned with the container positions in the cases, both in the downward portion of the trajectory (in Section 44) and during the container removal portion of the trajectory (Section 46).

Figure 2:
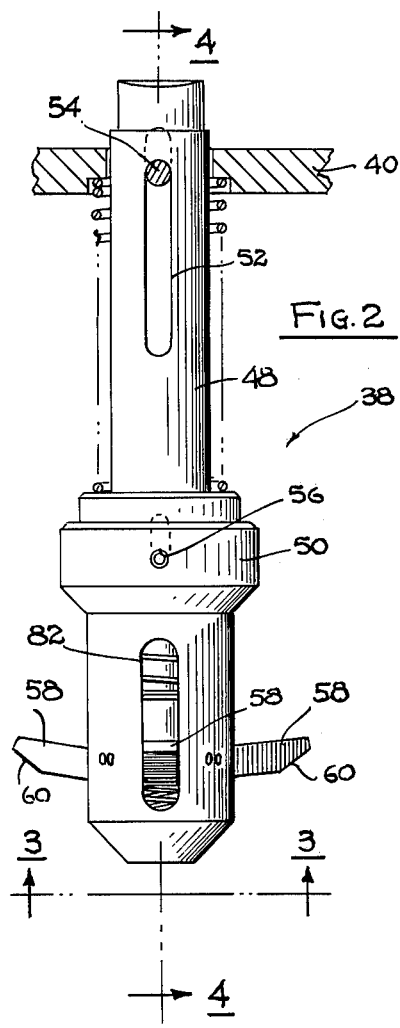
FIG. 2 is a partial cross section of a support bar providing a side view of a gripper attached thereto.
Figure 3:
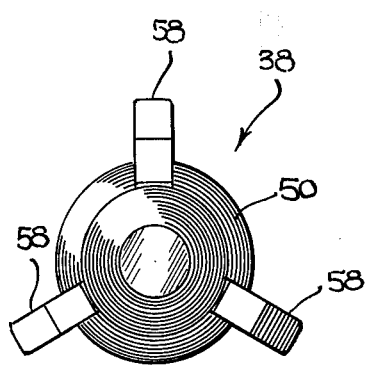
FIG. 3 is a bottom view of the gripper of FIG. 2 taken along line 3—3 of that FIGURE

Now referring to FIGS. 2 and 3, a side view and a bottom view, respectively, of a gripper 38 may be seen. The major gripper assembly is comprised of an upper housing 48 and a lower housing 50. The upper housing 48 in the preferred embodiment is a stainless steel tubular member having longitudinal diametrically opposed slots 52 for supporting the assembly on one of the horizontal bars 40 by means of a mounting pin 54. The upper housing 48 extends into a mating opening at the top of the lower housing 50, with the two parts being retained in the respective positions shown by a roll pin 56. Other parts of the gripper visible in FIGS. 2 and 3 include three gripper fingers 58, symmetrically disposed and outward extending from the lower region of the lower housing 50. It will be noted, particularly in FIG. 2, that the fingers 58 normally assume a somewhat upwardly inclined, outwardly extending position, with the lower portion of the outer region 60 of the fingers being beveled so as to define a surface having a substantial upward inclination.

Figure 5:
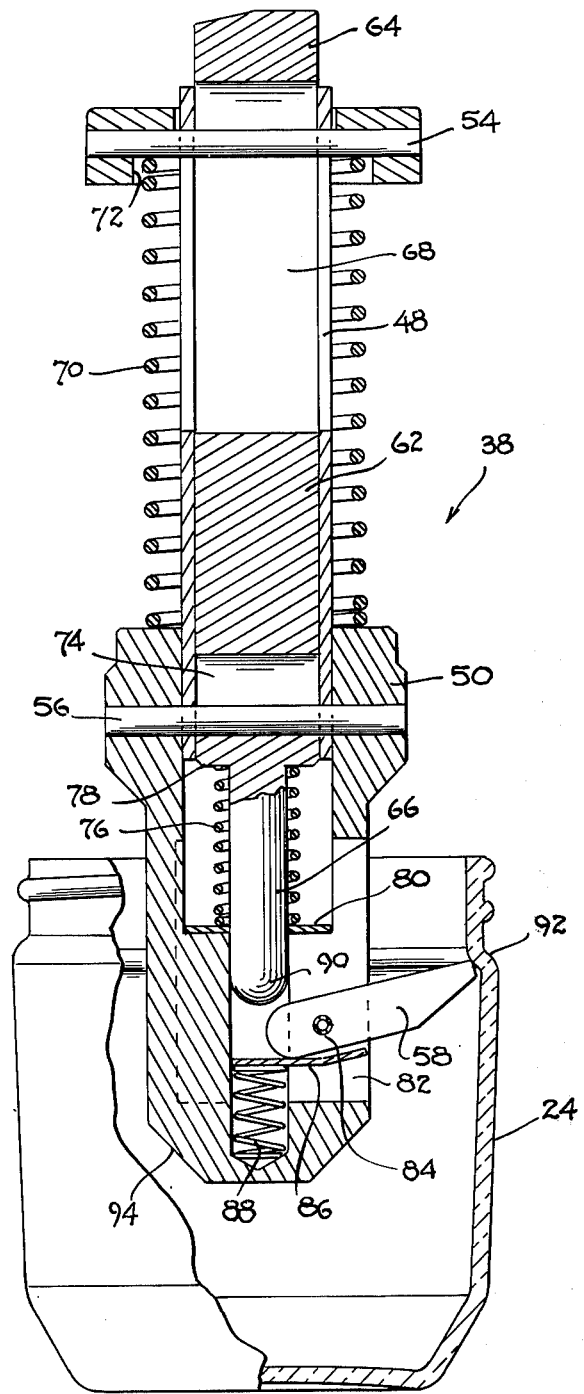
FIG. 5 is a partial cross section of a gripper illustrating its full engagement with a container.

Now referring to FIG. 5, a partial cross section of the gripper 38 may be seen. In this figure the gripper is shown in a gripping relationship with a typical container for which it may be used, specifically one of the wide mouth containers 24. Centrally disposed within the upper and lower housings 48 and 50 is an actuator 62 having an upper end 64 extending above the top of the upper housing 48 and a lower coaxial extension 66 for actuating the fingers 58. An extended through-slot in region 68 of the actuator 64 provides clearance for the mounting pin 54 in the same manner as the slot 52 in the upper housing 48, to allow (i) the relative vertical motion of the actuator 64 with respect to the upper housing 48 and the pin 54, and (ii) to allow vertical motion of the entire gripper assembly 38 with respect to the pin 54. A support spring 70 is retained within a bore 72 and the top of the lower housing 50 to encourage the gripper assembly to the lowermost position limited by the upper end of the slot 52 in the upper housing 48, at which position the actuator 62 still enjoys a further downward travel capability.

The actuator 62 has a second slot 74 therein adjacent the lower extension 66 through which the roll pin 56 passes, thereby defining the limit of vertical travel of the actuator 62 with respect to the upper housing 48 and the lower housing 50. The actuator 62 is retained normally in the upper position defined by the roll pin 56 and the slot 74 by a coil spring 76 operating between a shoulder 78 on the actuator 62 and a washer 80 disposed on an appropriately disposed shoulder within the lower housing 50.

Figure 7:
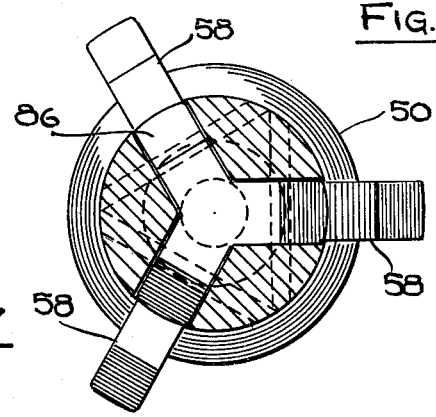
FIG. 7 is a cross sectional view of a gripper taken along line 7—7 of FIG. 4, illustrating the planform of the finger extender plate.

The lower housing 50 has three equally spaced slots 82 about its lower periphery (see also FIG. 2) within which the fingers 58 are disposed, being retained for limited rotation about horizontal axes by three roll pins 84 extending through the fingers and the adjacent lower housing walls. The fingers 58 are normally encouraged to the outward, slightly upward extending position illustrated in FIG. 2 by a three legged finger extender plate 86, encouraged to an upper position by an extender plate spring 88 in the lower region of the lower housing 50 so as to provide a cam action against the lower surface of the fingers 58. In FIG. 5, however, since the gripper is shown in a gripping relationship with a container, the fingers 58 are disposed in a slightly more upward projecting angle than in FIG. 2, with the finger extender plate 86 providing a cam action to lightly, but positively, encourage the fingers to a more outwardly directed disposition. (See also FIG. 7 for the planform of the finger extender plate 86.

It will be noted in the assembly of FIG. 5 that when in the normal gripping position the support spring 70 encourages the entire gripping assembly into the lowermost position shown and the spring 76 encourages the actuator 64 into the uppermost position (limited by the bottom of slot 74 in the actuator 62 and the pin 56) with respect to upper and lower housings 48 and 50 respectively, thereby moving the lowermost end 90 from engagement with the innermost ends of the fingers 58. At the same time, spring 88 encourages the finger extender plate 86 against the lower inner end of the fingers 58, encouraging the fingers to the more outward extending position to retain the fingers in engagement with the containers 24, more particularly, with the inner region of the slight step or ridge 92 adjacent the top of the container. In this regard it should be noted that the actuator 62, the lower housing 50 and the fingers 58 in the preferred embodiment are manufactured from Delrin, a plastic similar to nylon and having a substantial self-lubricating quality. This, in combination with the fact that the fingers 58 are encouraged to the outward extending position by a single spring 88 and finger extender plate 86, more specifically by contact with the plate 86 relatively close to the axis of the gripper, provides significant self centerig characteristics of the gripper assembly by encouraging the fingers to approximately equal extents of extension, and increasing the extending force on a finger having lesser extension than the others. Thus, the combination of three or more equally extending fingers and the nearly centrally disposed unitary spring actuation force provides a substantial self-centering effect so that if a container is initially engaged in a non-coaxial relationship with the gripper, the gripper will tend to encourage the container into a more coaxial relationship. Further, the specific configuration of gripper herein disclosed allows the use of a lower housing having a diameter of only approximately one-half of the diameter of the maximum finger extension circle, thereby allowing significant misalignment between the grippers and the containers being engaged. In that regard, the taper 94 at the bottom of the lower housing 50 allows even further misalignment, with the mounting of the gripper through coil spring 70 and pin 54 allowing temporary deflection of the gripper if required for insertion thereof into containers engaged in a substantially misaligned manner.

Figure 4:
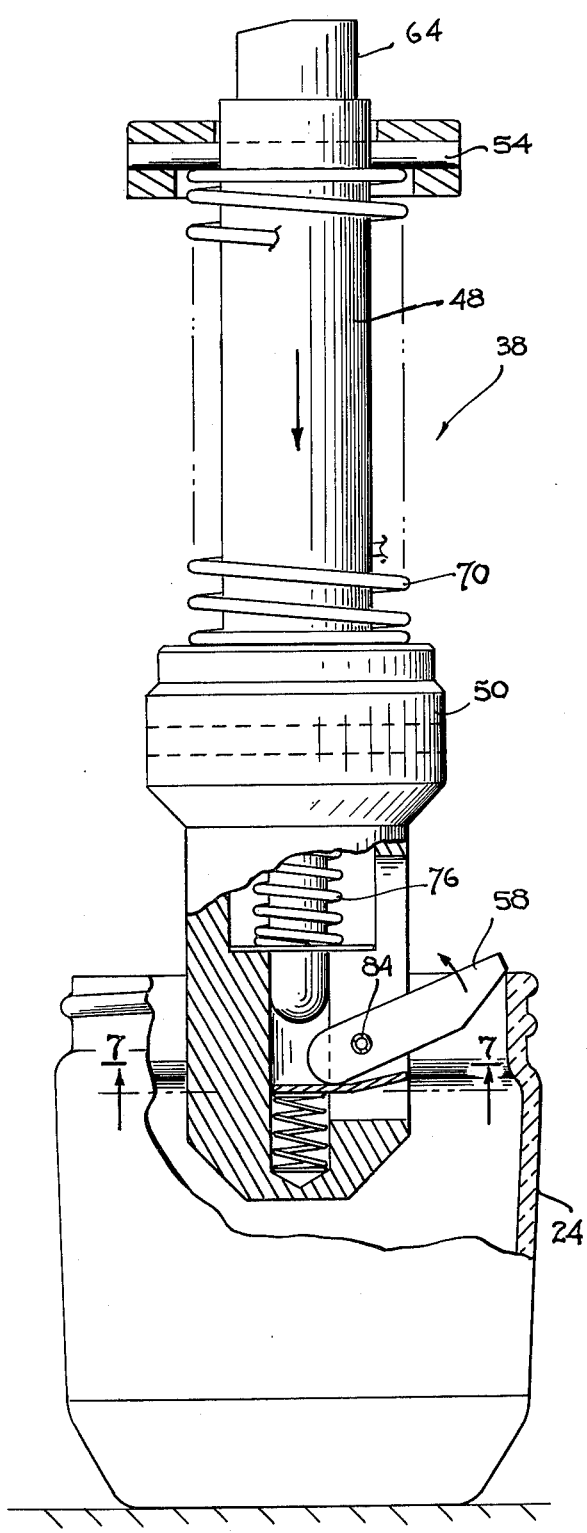
FIG. 4 is a partial cross section of a gripper taken along line 4—4 of FIG. 2, illustrating the insertion of the gripper into a container.

Now referring to FIG. 4, a view of the gripper 38 shown in partial cross section during engagement with a container 24 may be seen. It will be noted that during insertion of the gripper into a container the actuator is effectively decoupled from the motion of the fingers 58 by the actuator spring 76, and because of the proportions of the fingers 58 with respect to the pivot on pin 84, the container has a relatively high degree of leverage for encouraging the fingers upward as shown in the figure to enable relatively low force entry of the gripper into the container. However, because of the relatively shallow angle of the grippers 58, once positioned within the container as shown in FIG. 5, rather positive locking of the container with respect thereto is achieved. In that regard it should be noted that in the preferred embodiment the fingers 58 are Delrin, and accordingly once the fingers move above ridge 92 they are generally free to slide out of the container because of the relatively low friction therebetween. However if desired, a rubber-like material could be used for the fingertips to provide a high sliding friction to retain containers other than by the ridge adjacent the top thereof, though unless such an arrangement is necessary, it is not preferred for reasons which shall subsequently become apparent. However, certain coated fiberboard containers can only be retained by rubber-like fingertips which frictionally engage and hold the container since such containers do not have a ridge.

Figure 6:
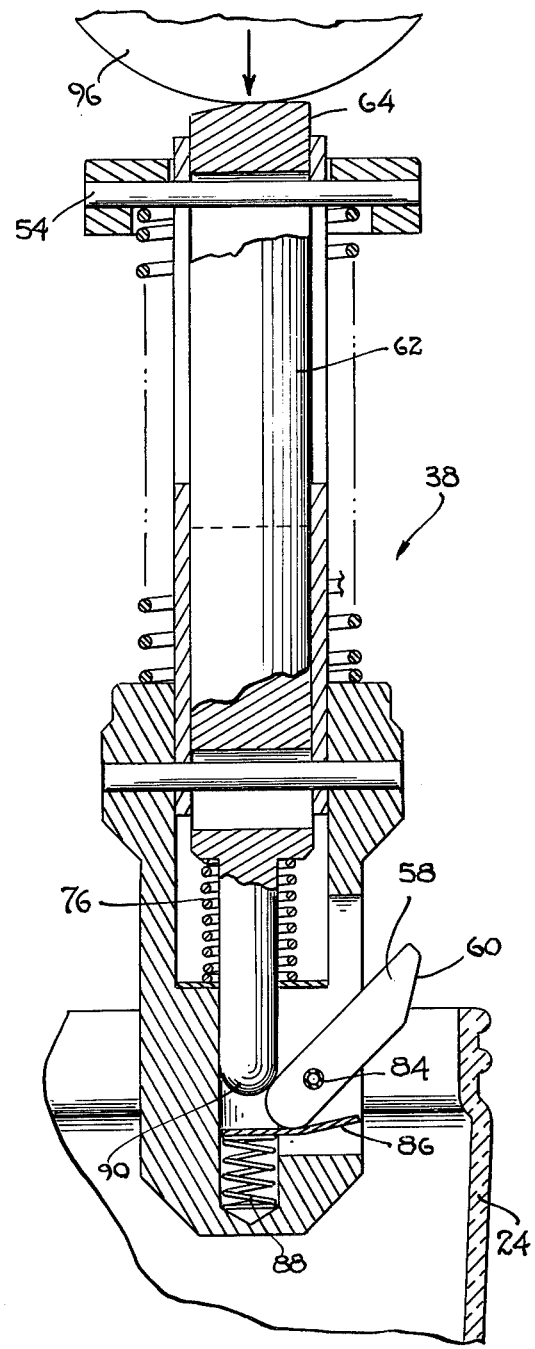
FIG. 6 is a partial cross section of a gripper illustrating the actuation of the gripper for the release of a container previously held thereby.

Now referring to FIG. 6, a partial cross-sectional view of the gripper 38 while releasing a container 24 may be seen. A roller 96 supported on the same shaft as sprocket 34 (see FIG. 1) is disposed to engage the top 64 of the actuator 62 to encourage the actuator toward its lowermost position. This forces end 90 of the actuator 62 downward against the inner end of fingers 58, thereby causing the fingers to deflect upward against the resistance of coil spring 88, moving the fingers inward to a smaller radius to allow clearance between the gripper and the container. By providing a small amount of space for the settling of the containers onto a receiving conveyor 22, the containers will settle downward, assuring that the fingers 58 may not again extend over the ridge 92 on the container to again grasp the container at that location. Thus while the desired function contemplates holding the actuator 62 downward as the entire gripper is lifted upward out of the containers, in the preferred embodiment a positive high reliability release has been obtained by the use of rollers, such as rollers 96, only relatively momentarily holding the actuators downward, provided some slight space is allowed for the settling of the containers onto the receiving conveyor once released. This is a substantial advantage, as negligible friction is encountered between the actuator 62 and the roller moving substantially in unison therewith, as would otherwise be encountered if extended cam surfaces or the like were required to hold the actuator downward for a sustained period. (The duration of depression of the actuator 62 and the extent of settling of the container onto the receiving conveyor 22 which are required to assure a positive release will in general depend upon whether or not the gripper will retain the containers being handled other than by a ridge such as the ridge 92.)

There has been described herein a new and unique gripper for containers in the processing and packaging industries, which containers typically are relatively fragile containers of glass or plastic or coated fiberboard and which may have very restrictive contamination requirements such as in the food packaging industries. The invention allows the gripping of individual containers without requiring any coordinated controls thereto, such as pressure or vacuum controls, and provides positive gripping of the containers until a simple release operation is executed at the delivery point. The grippers in conjunction with their mechanism allow engagement between the grippers and the containers being engaged at a substantial axial misalignment without damage or malfunction, and provide automatic centering tendencies so as to minimize disturbance in the position of adjacent grippers and containers. By constructing major portions of the grippers form a self-lubricating plastic, long life with substantially no maintenance of the grippers is achieved. If, however, the grippers of the present invention encounter interference rather than normal engagement with containers, as may be caused by broken containers, inverted containers or unopened cases, the grippers will merely deflect upward, resulting in no further damage to the containers and no damage to the uncasing apparatus.

Obviously, while only the preferred embodiment of the present invention has been described herein, that is, an embodiment specifically adapted for direct application to uncasers in accordance with U.S. Pat. No. 3,938,847, it will be understood by those skilled in the art that various changes in form and detail may be made therein depending upon the nature of the containers to be handled and the transport mechansim on which the grippers are to be mounted, all within the spirit and scope of the present invention.

I claim:

1. Container gripper apparatus for gripping a container from within upon engagement along a longitudinal axis comprising;
   a housing means;
   a plurality of gripper members, said gripper members being equally spaced about the periphery of said housing means adjacent the lower end thereof and extending generally radially outward therefrom, each of said gripper members being coupled to said housing means for rotation between extended and retracted positions about axes generally perpendicular to and spaced from said longitudinal axis;
   means for yieldably encouraging said gripper members to the extended position; and
   an actuator, said actuator being slidably coupled to said housing for relative sliding motion with respect thereto in the direction of said longitudinal axis between extended and depressed positions, said actuator being disposed to engage the inward extending ends of said gripper members when moved to said depressed position.

2. The apparatus of claim 1 wherein said plurality of gripper members comprises at least three gripper members.

3. The apparatus of claim 1 wherein said actuator is generally slidably housed in said housing means and extends beyond the upper end thereof so as to be accessible for depression from above.

4. The apparatus of claim 3 further comprised of spring means for encouraging said actuator to the extended position.

5. The apparatus of claim 1 wherein said gripper members are elongate members rotationally coupled to said housing means near the inner end thereof, said means for yielding encouraging said gripper members to the extended position being a spring means for encouraging the inner end of said gripper members upward.

6. The apparatus of claim 5 wherein said gripper members extend outward and slightly upward when in the freely extended position.

7. The apparatus of claim 1 further comprised of a support for coupling to a transport system, and a mounting spring means, said housing being coupled to said support so as to be movable along said longitudinal axis between upper and lower positions with respect thereto, said mounting spring means being a means for encouraging said housing means to said lower position.

8. The apparatus of claim 1 wherein said gripper members are self lubricating plastic members.

9. The apparatus of claim 1 whrein said gripper members in said extended position extend to at least approximately twice the diameter of the periphery of the adjacent housing means.

10. A container gripper apparatus for engaging and transporting containers of glass, plastic and like materials comprising:
    a housing means;
    a plurality of gripper members, said gripper members being equally spaced about the periphery of said housing means adjacent the lower end thereof and extending generally radially outward therefrom, each of said gripper members being coupled to said housing means for rotation between extended and retracted positions about axes generally perpendicular to and spaced from said longitudinal axis, the outer end of said gripper members extending further radially outward when in the extended position than in said retracted position, and being rotatable upward toward said retracted position upon contact with a container opening;
    means for yieldably encouraging said gripper members to the extended position; and
    an actuator, said actuator being slidably coupled to said housing for relative sliding motion with respect thereto in the direction of said longitudinal axis between extended and depressed positions, said actuator being disposed to engage the inward extending ends of said gripper members when moved to said depressed position.

11. The apparatus of claim 10 wherein said plurality of gripper members comprises at least three gripper members.

12. The apparatus of claim 10 wherein said actuator is generally slidably housed in said housing means and extends beyond the upper end thereof so as to be accessible for depression from above.

13. The apparatus of claim 12 further comprised of spring means for encouraging said actuator to the extended position.

14. The apparatus of claim 10 wherein said gripper members are elongate members rotationally coupled to said housing means near the inner end thereof, said means for yieldably encouraging said gripper members to the extended position being a spring means for encouraging the inner end of said gripper members upward.

15. The apparatus of claim 14 wherein said gripper members extend outward and slightly upward when in the freely extended position.

16. The apparatus of claim 10 further comprised of a support for coupling to a transport system and a mounting spring means, said housing means being coupled to said support so as to be movable along said longitudinal axis between upper and lower positions with respect thereto, said mounting spring means being a means for encouraging said housing means to said lower position.

17. The apparatus of claim 10 wherein said gripper members are self lubricating plastic members.

18. The apparatus of claim 10 wherein said gripper members in said extending position extend to at least approximately twice the diameter as the periphery of the adjacent housing means.

* * * * *